United States Patent [19]

Franzén et al.

[11] Patent Number: 4,503,028

[45] Date of Patent: Mar. 5, 1985

[54] METHOD IN THE PRODUCTION OF HYDROGEN PEROXIDE

[75] Inventors: Bengt G. Franzén, Torslanda; Wolfgang Herrmann, Gothenburg, both of Sweden

[73] Assignee: Eka AB, Surte, Sweden

[21] Appl. No.: 428,435

[22] Filed: Sep. 29, 1982

[30] Foreign Application Priority Data

Oct. 22, 1981 [SE] Sweden .................. 8106244

[51] Int. Cl.³ ............................................. C01B 15/02
[52] U.S. Cl. ..................................... 423/588; 203/14; 203/49
[58] Field of Search ................ 423/588; 203/14, 49

[56] References Cited

U.S. PATENT DOCUMENTS

| | | | |
|---|---|---|---|
| 763,387 | 6/1904 | Gathmann | 203/49 |
| 1,833,717 | 11/1931 | Laird | 203/49 |
| 1,854,385 | 4/1932 | Van Schaack | 203/14 |
| 1,996,852 | 4/1935 | Bergell | 203/49 |
| 2,867,507 | 1/1959 | Gleason et al. | 423/588 |
| 3,111,460 | 11/1963 | Orr | 203/49 |
| 3,326,778 | 6/1967 | Mock | 203/49 |
| 3,345,272 | 10/1967 | Collins | 203/49 |
| 3,409,515 | 11/1968 | Baird et al. | 203/49 |

OTHER PUBLICATIONS

Kirk-Othmer, *Encyclopedia of Chemical Technology*, Third Edition, vol. 8, (1979), John Wiley & Sons, p. 78.

Primary Examiner—John Doll
Assistant Examiner—Wayne A. Langel
Attorney, Agent, or Firm—Luedeka & Neely

[57] ABSTRACT

A method in the production of hydrogen peroxide by the anthraquinone process is described, in which method anthraquinone derivatives dissolved in a working solution are subjected alternatingly to hydrogenation and oxidation. To reduce the relative moisture in the working solution to a suitable level of 20–98%, preferably 40–85%, the working solution is dried prior to hydrogenation by contacting it with a gas or a gaseous mixture, the water vapor pressure of which is below that of the working solution. Suitable gases or gas mixtures are air or exhaust gases from the oxidation stage of the anthraquinone process.

1 Claim, 1 Drawing Figure

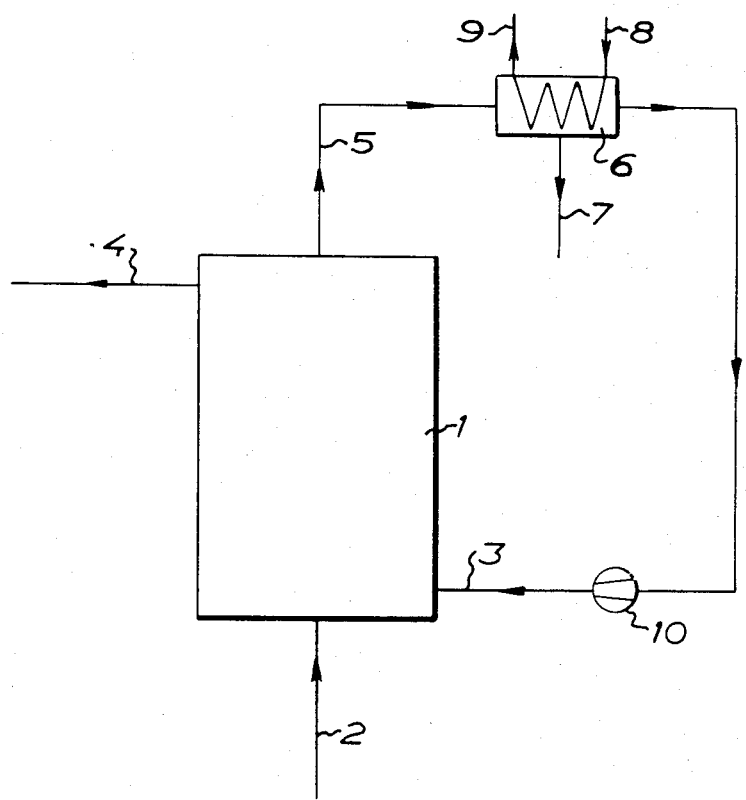

METHOD IN THE PRODUCTION OF HYDROGEN PEROXIDE

The present invention relates to a method in the production of hydrogen peroxide according to the so-called anthraquinone method, in which method the working solution used in the anthraquinone process is dried prior to hydrogenation of the anthraquinone derivatives dissolved in the working solution.

In the so-called anthraquinone process for the production of hydrogen peroxide, anthraquinone derivatives are hydrogenated by hydrogen gas to anthrahydroquinone derivatives. The resulting anthrahydroquinone derivative is then oxidized with molecular oxygen back to the anthraquinone derivative, whereby hydrogen peroxide is formed. The resulting hydrogen peroxide is extracted with water, whereupon the working solution is recycled to the hydrogenation. The reaction schedule may be exemplified as follows

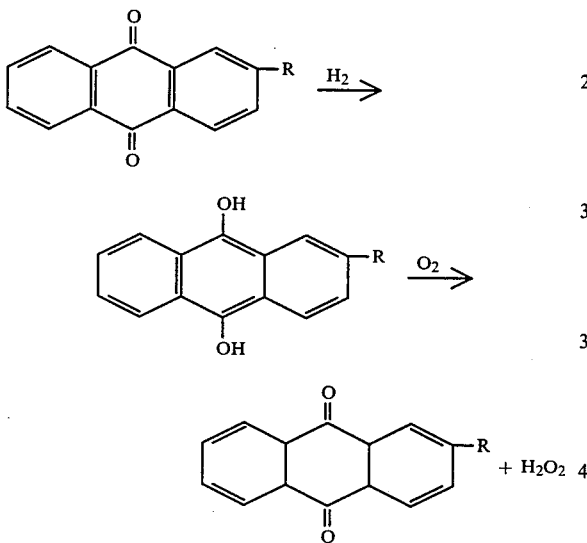

R=alkyl, for instance $C_2H_5$

Upon extraction, the working solution is saturated with water. It may also contain a minor amount of finely divided free water which blocks the catalyst used for the hydrogenation. If use is made of a suspension catalyst, the water may cause the catalyst to coagulate, and this is why the working solution during hydrogenation must not contain more water than corresponds to a relative moisture of about 98%. (Horst Pistor: Chem. Tech. 1, 3.A, 540.)

Furthermore, the water content in the working solution must not be too low because a suitable amount of homogeneously dissolved water in the working solution activates the hydrogenation catalyst.

The solubility of water in the working solution may be lower in a hydrogenated working solution than in an oxidized working solution. If, for example, a relative moisture of 95% is desired in the hydrogenation stage, it may thus be necessary to dry the working solution to a lower moisture content prior to hydrogenation. In connection herewith, regard must be paid also to the moisture which may be present in the hydrogen gas used for the hydrogenation and which passes to the working solution when the hydrogen gas is consumed.

Because of the above described detrimental effect of free water in the working solution, the relative moisture content of the working solution should lie at 20-98%, preferably at 40-85%.

In order to achieve the desired relative moisture in the working solution, the content of free water can be reduced by some suitable separation method.

One of the methods hitherto employed in order to remove part of the water homogeneously dissolved in the working solution resides in that the working solution is dried by contacting it with a hygroscopic liquid, for instance 35% potassium carbonate solution. On drying, the carbonate solution will be diluted with water and, in order to maintain its drying capacity, more carbonate must be added successively, or the solution must be evaporated, and this means an expenditure of energy. Besides, the contact with the potassium carbonate solution may impart to the working solution an alkalinity which is unsuitable for, inter alia, the oxidation.

Furthermore, it has been suggested to conduct the extraction of hydrogen peroxide from the oxidized working solution at relatively low temperature, followed by separation of free water, and then to increase the temperature of the working solution by 28-30° C. prior to hydrogenation, whereby the relative moisture of the working solution can be reduced to a suitable level below 100%. The disadvantages of this method are, inter alia, that the heating requires energy, and it is difficult to control the moisture content to a suitable level. Depending upon the solvents used in the working solution, the solubility of the water is increased to a greater or less extent at elevated temperature, and furthermore the ability of a hydrogenated working solution to dissolve water frequently is far below that of an oxidized working solution.

The present invention has for its object to provide a method in the production of hydrogen peroxide by the anthraquinone process in which anthraquinone derivtives dissolved in a working solution are subjected alternatingly to hydrogenation and oxidation, said method being characterized in that the working solution is dried prior to hydrogenation by contacting it with a gas or a gaseous mixture, the water vapor pressure of which is below that of the working solution.

The method according to the invention can be carried out in any desorption apparatus suitable for this particular purpose, such as a column with sieve plates or packings, or some type of reactor in which the gas is dispersed in the liquid under agitation. In a column, the working solution and the gas can be conducted cocurrently from top to bottom or from bottom to top. Countercurrent flow may also be employed, in which case the gas is supplied at the base of the column and the liquid at the top thereof.

The anthraquinone process usually incorporates processes for purification of the working solution in the process cycle between the extraction stage and the hydrogenation stage. The method according to the present invention may therefore be incorporated before, after or between these purification processes, whichever alternative is preferred.

The gas or gaseous mixture which is used in the method according to this invention preferably is air or a gas or gaseous mixture consisting of one or more of the gases comprised by pure air.

If drying is effected at relatively high temperature, and if the working solution is sensitive to oxidizing conditions, it may be suitable to use a gas having a low content of oxygen gas, preferably at most 8% by volume. An especially preferred gaseous mixture in the context is one which contains at the lowest 97% by volume of nitrogen gas or carbon dioxide.

Another suitable drying medium are the exhaust gases from the anthraquinone process which can be used without necessitating the removal of solvent vapors.

It is also advantageous to effect drying with recirculating gas which is cooled after each passage of the drying stage for the working solution, for instance in a column, the water absorbed by the gas from the working solution being separated in the form of condensate.

The drying method according to this invention requires no complicated control equipment to impart unfailingly a suitable water content to the working solution prior to hydrogenation.

The energy consumption is moderate, and the method can be carried out at relatively low temperatures and with oxygen-poor gas, i.e. under conditions conserving the working solution.

The attached FIGURE illustrates diagrammatically an apparatus for carrying the method according to this invention into effect.

With reference to this FIGURE, the working solution is supplied to the vessel 1 through the conduit 2 where it is dried. The dried working solution leaves the vessel 1 through the conduit 4. The moisture-enriched gas is conducted out of the vessel 1 through the conduit 5 to the cooler 6 where the temperature of the gas is reduced, whereby water is separated in the form of condensate. The water is led off through the conduit 7. Coolant is supplied to and discharged from the cooler 6 through the conduits 8 and 9, respectively. After cooling, the gas is recycled to the vessel 1 by means of a device 10 for increasing the pressure.

The drying method according to the invention preferably is conducted at a temperature of 25–90° C., preferably 35–70° C.

A suitable pressure range within which drying according to the present invention may be conducted is 0.2–5 bars absolute pressure, preferably 0.8–1.2 bar absolute pressure.

The gas leaving the drying process is cooled, whereby water and solvent condensates are obtained. The gas is then conducted over, for example, active carbon to further reduce the solvent content.

The invention will now be illustrated in more detail with reference to the following Examples which merely describe preferred embodiments of the invention.

EXAMPLE 1

At the bottom end of a column having an inner diameter of 100 mm, an effective height of 1100 mm and filled with ¼" "Intalox" saddles, 22.8 l/h of working solution and 0.34 Nm$^3$/h of exhaust gas from the air oxidation stage in the anthraquinone process were introduced continuously. The working solution in which the solvents were "Shellsol AB" and a mixture of higher aliphatic, secondary alcohols in a volume ratio of 1:1, was saturated with water, which corresponded to 6.7 g water/l.

The relative moisture of the exhaust gas supplied to the column was about 47% after expansion from 2.55 bars to about 1.2 bar at 20° C. The working solution and the gas discharged from the column had a temperature of 48° C. The pressure at the column top was 1.05 bar.

After passage through the column, the working solution contained 5.4 g water/l, i.e. its relative moisture was about 80%.

EXAMPLE 2

In a device corresponding to the FIGURE, a working solution which contained the solvents "Shellsol AB" and trioctyl phosphate was dried by means of air nitrogen containing less than 1% oxygen gas. Drying was effected in a column having a diameter of 100 mm and which was filled, to a level of 2.0 m, with 6×6 mm porcelain rings.

88 l/h working solution were continuously supplied to the column. The temperature of the working solution supplied was 53° C. 2.75 Nm$^3$/h gas were circulated through the column. The gas which left the column at a pressure of about 1.01 bar, was cooled to 20° C.

The working solution supplied contained at saturation 3.4 g H$_2$O/l. After drying, the water content was 2.2 g/l, i.e. it was dried to a relative moisture of 65%.

What we claim and desire to secure by Letters Patent is:

1. A method for the production of hydrogen peroxide by the anthraquinone process in which anthraquinone derivatives are dissolved in a working solution which is successively and repeatedly subjected to a hydrogenation step, to an oxidation step wherein said hydrogenated working solution is oxidized with air at a pressure substantially above atmospheric pressure, and to an extraction step wherein hydrogen peroxide is extracted from the oxidized working solution with water, said working solution then being recycled through a drying zone prior to the hydrogenation step, the improvement comprising conducting exhaust gases from said oxidation step to said drying zone for said working solution, said drying zone being maintained at about atmospheric pressure, the relative moisture in said exhaust gases being reduced as a result of the reduction in pressure from said oxidation step to said drying zone, and said working solution in said drying zone being contacted with said exhaust gases at a temperature of from about 35–70° C. to effect the drying of said working solution to a relative moisture of 20–98%.

* * * * *